McConaughey & Adams,
Lock Nut.

No. 103,220. Patented May 17, 1870.

Witnesses
Jno. W. Ellis
J. V. White

Inventors
Thomas B. McConaughey & Jas. Adams,
Per
T. H. Alexander
Atty.

United States Patent Office.

THOMAS B. McCONAUGHEY AND JAMES ADAMS, OF NEWARK, DELAWARE.

Letters Patent No. 103,220, dated May 17, 1870.

IMPROVEMENT IN NUT-LOCKS.

The Schedule referred to in these Letters Patent and making part of the same.

*To all whom it may concern:*

Be it known that we, THOMAS B. MCCONAUGHEY and JAMES ADAMS, of Newark, in the county of New Castle and State of Delaware, have invented certain new and useful Improvements in Nut-Fastening; and we do hereby declare that the following is a full, clear, and exact description thereof, reference being had to the accompanying drawings and to the letters of reference marked thereon, which form part of this specification.

The nature of our invention consists in the construction and arrangement of a "nut-fastening," as will be hereinafter fully set forth.

In order to enable others skilled in the art to which our invention appertains to make and use the same, we will now proceed to describe its construction and operation, referring to the annexed drawings, in which—

Figure 1:
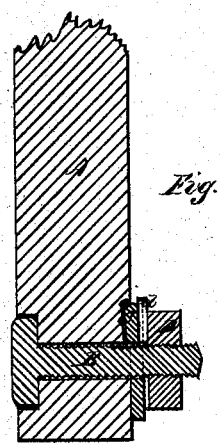
Figure 1 is a longitudinal vertical section of our invention.
Figure 2:
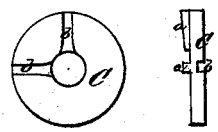
Figure 2 shows the construction of the washer.
Figure 3:
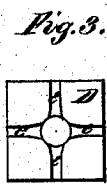
Figure 3 is a bottom view of the nut.

A represents the timber through which the bolt B passes.

C is the washer placed on the bolt B, said washer being on its under side provided with one or more projections or flanges $a$ $a$, which are placed in indentations on the timber A, so as to prevent the washer from turning on the bolt.

In the upper side of the washer are one or more grooves $b$, radiating from the center, which groove or grooves are wider at their inner ends than at the outer ends.

D is the nut, which is, on its under side, provided with similar grooves $e$ $e$; also wider at their inner ends than at the outer, said grooves forming, with the grooves $b$ in the washer, when the nut is screwed tightly down, a key-seat for the insertion of a spring key, $d$.

The key-seat thus formed, being wider or larger in the inside than it is on the outside, allows the spring key to spread or expand, preventing it from getting out of place by jarring, thus preventing the nut from coming loose.

The spring key $d$ can very easily be pulled out when desired to take the nut off.

Having thus fully described our invention,

What we claim as new, and desire to secure by Letters Patent, is—

The combination of the bolt B, washer C, nut D, projections $a$, key-seat $b$ $e$, and spring key $d$, all substantially as and for the purposes herein set forth.

In testimony that we claim the foregoing as our own, we affix our signatures in presence of two witnesses.

THOS. B. McCONAUGHEY.
JAMES ADAMS.

Witnesses:
JAS. H. RAY,
EDWARD WILSON.